(12) United States Patent
Duguid et al.

(10) Patent No.: US 11,141,784 B2
(45) Date of Patent: Oct. 12, 2021

(54) MG-BASED ALLOY FOR HYDROGEN STORAGE

(71) Applicant: Hydrexia Pty Ltd, Queensland (AU)

(72) Inventors: Andrew Charles Duguid, Queensland (AU); Kazuhiro Nogita, Queensland (AU); Xin Fu Tan, Queensland (AU); John Andrew Taylor, Queensland (AU)

(73) Assignee: HYDREXIA PTY LTD., Yeerongpilly (AU)

( * ) Notice: Subject to any disclaimer, the term of this patent is extended or adjusted under 35 U.S.C. 154(b) by 422 days.

(21) Appl. No.: 15/742,262

(22) PCT Filed: Jul. 25, 2016

(86) PCT No.: PCT/AU2016/050659
§ 371 (c)(1),
(2) Date: Jan. 5, 2018

(87) PCT Pub. No.: WO2017/011881
PCT Pub. Date: Jan. 26, 2017

(65) Prior Publication Data
US 2018/0214940 A1    Aug. 2, 2018

(30) Foreign Application Priority Data

Jul. 23, 2015 (AU) .................................. 2015902939

(51) Int. Cl.
*C22C 23/00* (2006.01)
*B22D 21/04* (2006.01)
(Continued)

(52) U.S. Cl.
CPC .......... *B22D 21/04* (2013.01); *B22D 21/007* (2013.01); *C01B 3/0031* (2013.01); *C22C 9/00* (2013.01);
(Continued)

(58) Field of Classification Search
None
See application file for complete search history.

(56) References Cited

U.S. PATENT DOCUMENTS 1,957,934 A * 5/1934 Brooks .................. C22C 23/00
420/409
2,124,557 A * 7/1938 Gann ...................... C22C 23/00
420/402
(Continued)

FOREIGN PATENT DOCUMENTS

| CA | 1177624 | 11/1984 |
| CA | 2219522 C | 11/1996 |

(Continued)

OTHER PUBLICATIONS

Lambert, Simon. "Modification of cast Mg—Cu alloys for hydrogen storage." B.Sc Thesis, School of Engineering, The University of Queensland. https://espace.library.uq.edu.au/view/UQ:312212 (Year: 2004).*

(Continued)

*Primary Examiner* — Patricia L. Hailey
*Assistant Examiner* — Christopher D. Moody
(74) *Attorney, Agent, or Firm* — The Dobrusin Law Firm, P.C.

(57) ABSTRACT

A range of alloys of Mg and at least one of Cu, Si, Ni and Na alloys that is particularly suitable for hydrogen storage applications. The alloys of the invention are formed into binary and ternary systems. The alloys are essentially hypo-eutectic with respect to their Cu and Ni contents, where one or both of these elements are present, but range from hypoeutectic through to hypereutectic with respect to their Si content when that element is also present. The terms hypoeutectic and hypereutectic do not apply to Na if it is added to the alloy. The alloy compositions disclosed provide high performance alloys with regard to their hydrogen (Continued)

storage and kinetic characteristics. They are also able to be formed using conventional casting techniques which are far cheaper and more amenable to commercial use than the alternative ball-milling and rapid solidification techniques which are much more expensive and complex. Each of the individual binary Mg-E systems, where E=Cu, Ni or Si, forms a eutectic comprising of Mg metal and a corresponding $Mg_xE_y$ intermetallic phase.

4 Claims, 6 Drawing Sheets

(51) Int. Cl.
  B22D 21/00 (2006.01)
  C01B 3/00 (2006.01)
  C22C 9/00 (2006.01)
(52) U.S. Cl.
  CPC .......... *C22C 23/00* (2013.01); *C22C 2200/04* (2013.01); *C22C 2202/04* (2013.01); *Y02E 60/32* (2013.01)

(56) References Cited

U.S. PATENT DOCUMENTS

| | | | |
|---|---|---|---|
| 3,837,527 | A | 9/1974 | Kutik et al. |
| 4,016,836 | A | 4/1977 | MacKay et al. |
| 4,200,624 | A | 4/1980 | Muller et al. |
| 4,402,187 | A | 9/1983 | Golbert et al. |
| 4,446,111 | A | 5/1984 | Halene et al. |
| 4,446,121 | A | 5/1984 | Gamo |
| 4,583,638 | A | 4/1986 | Bernauer et al. |
| 4,946,646 | A | 8/1990 | Gamo et al. |
| 4,964,524 | A | 10/1990 | Halene |
| 5,006,328 | A | 4/1991 | Hong |
| 5,366,820 | A | 8/1994 | Tsutsumi et al. |
| 5,501,917 | A | 3/1996 | Hong |
| 5,506,069 | A | 4/1996 | Ovshinsky et al. |
| 5,564,587 | A | 10/1996 | Falk et al. |
| 5,695,530 | A | 12/1997 | Hong et al. |
| 5,733,680 | A | 3/1998 | Hong |
| 5,766,799 | A | 6/1998 | Hong |
| 5,862,937 | A | 1/1999 | Carrizales et al. |
| 5,863,577 | A | 1/1999 | Lynch et al. |
| 5,906,792 | A | 5/1999 | Schulz |
| 6,099,811 | A | 8/2000 | Stetson et al. |
| 6,153,032 | A | 11/2000 | Iba |
| 6,207,104 | B1 | 3/2001 | Kadir et al. |
| 6,258,184 | B1 | 7/2001 | Iba et al. |
| 6,274,194 | B1 | 8/2001 | Mori et al. |
| 6,328,821 | B1 | 12/2001 | Ovshinsky et al. |
| 6,338,764 | B1 | 1/2002 | Mori et al. |
| 6,387,152 | B1 | 5/2002 | Klassen et al. |
| 6,418,275 | B1 | 7/2002 | Yang |
| 6,471,935 | B2 | 10/2002 | Jensen et al. |
| 6,478,844 | B1 | 11/2002 | Ovshinsky |
| 6,491,866 | B1 | 12/2002 | Ovshinsky et al. |
| 6,508,866 | B1 | 1/2003 | Golben |
| 6,602,639 | B1 | 8/2003 | Nakamura |
| 6,630,648 | B2 | 10/2003 | Gruenwald |
| 6,689,193 | B1 | 2/2004 | Hosoe et al. |
| 6,702,878 | B2 | 3/2004 | Ito et al. |
| 6,709,497 | B2 | 3/2004 | Myasnikov et al. |
| 6,726,783 | B1 | 4/2004 | Young et al. |
| 6,746,645 | B2 | 6/2004 | Ovshinsky et al. |
| 7,056,397 | B2 | 6/2006 | Noreus et al. |
| 7,060,120 | B1 | 6/2006 | Kanoya et al. |
| 7,094,387 | B2 | 8/2006 | Zidan |
| 7,115,247 | B2 | 10/2006 | Zhao et al. |
| 7,128,997 | B2 | 10/2006 | Harding et al. |
| 7,147,690 | B2 | 12/2006 | Shimada et al. |
| 7,175,721 | B2 | 2/2007 | Takata et al. |
| 7,175,826 | B2 | 2/2007 | Lemmon et al. |
| 8,257,473 | B2 | 1/2012 | McCombs et al. |
| 9,234,264 | B2 | 1/2016 | Dahle et al. |
| 9,435,489 | B2 | 9/2016 | Pierce et al. |
| 2002/0100369 | A1 | 8/2002 | Kuriiwa et al. |
| 2002/0125267 | A1 | 9/2002 | Gruenwald |
| 2002/0197181 | A1 | 12/2002 | Osawa et al. |
| 2004/0031591 | A1 | 2/2004 | Myasnikov et al. |
| 2004/0110023 | A1 | 6/2004 | Towata et al. |
| 2005/0051233 | A1 | 3/2005 | Wodjenski |
| 2006/0027041 | A1 | 2/2006 | Arashima et al. |
| 2006/0027272 | A1 | 2/2006 | Tomlinson et al. |
| 2006/0032561 | A1 | 2/2006 | Young et al. |
| 2006/0051233 | A1 | 3/2006 | Ugai et al. |
| 2006/0051656 | A1 | 3/2006 | Ouwerkerk et al. |
| 2006/0068286 | A1 | 3/2006 | Mukai |
| 2006/0073066 | A1 | 4/2006 | Osawa et al. |
| 2006/0099127 | A1 | 5/2006 | Zaluska et al. |
| 2006/0108457 | A1 | 5/2006 | Pratt et al. |
| 2006/0159613 | A1 | 7/2006 | McGrady |
| 2006/0166099 | A1 | 7/2006 | Okabe et al. |
| 2006/0199076 | A1 | 9/2006 | Yasuoka et al. |
| 2006/0246177 | A1 | 11/2006 | Miki et al. |
| 2006/0257314 | A1 | 11/2006 | Natarajan |
| 2006/0266441 | A1 | 11/2006 | Fetcenko et al. |
| 2007/0006950 | A1 | 1/2007 | Okada et al. |
| 2008/0044704 | A1 | 2/2008 | Kubo |
| 2009/0123325 | A1* | 5/2009 | Dahle .................... C22C 23/00 420/402 |
| 2010/0155264 | A1 | 6/2010 | Yu et al. |
| 2010/0257873 | A1 | 10/2010 | Muellet et al. |
| 2011/0000798 | A1 | 1/2011 | Ornath |
| 2011/0192732 | A1 | 8/2011 | Lin et al. |
| 2011/0236790 | A1 | 9/2011 | Schubert |
| 2012/0298206 | A1 | 11/2012 | Pierce et al. |
| 2012/0312701 | A1 | 12/2012 | Greaves et al. |
| 2017/0030523 | A1 | 2/2017 | Emilsen et al. |

FOREIGN PATENT DOCUMENTS

| | | |
|---|---|---|
| CN | 1256456 C | 1/2005 |
| CN | 1754972 | 4/2006 |
| CN | 1769506 A | 5/2006 |
| CN | 1786239 A | 6/2006 |
| DE | 102007058671 | 6/2009 |
| GB | 2148477 A | 5/1985 |
| JP | S63-277875 | 5/1990 |
| JP | 2002-180174 A | 6/2002 |
| JP | 2001-213604 | 1/2003 |
| JP | 2003-147471 A | 5/2003 |
| JP | 2003-147472 A | 5/2003 |
| JP | 2006-177434 | 7/2006 |
| JP | 2006-179441 | 7/2006 |
| WO | 1995/034918 | 12/1995 |
| WO | 1996/019594 | 6/1996 |
| WO | 1996/036083 | 11/1996 |
| WO | 1997/019202 | 5/1997 |
| WO | 1999/055926 | 11/1999 |
| WO | 2001/038591 | 5/2001 |
| WO | 2001/039289 | 5/2001 |
| WO | 2001/092592 | 12/2001 |
| WO | 2002/007240 | 1/2002 |
| WO | 2002/043170 | 5/2002 |
| WO | 2003/002451 | 1/2003 |
| WO | 2003/006874 | 1/2003 |
| WO | 2005/060547 | 7/2005 |
| WO | 2005/100624 | 10/2005 |
| WO | 2006/029027 A1 | 3/2006 |
| WO | 2006/033847 | 3/2006 |
| WO | 2006/036554 | 4/2006 |
| WO | 2006/060851 | 6/2006 |
| WO | 2006/063627 | 6/2006 |
| WO | 2006/075501 | 7/2006 |
| WO | 2006/079312 | 8/2006 |
| WO | 2006/085542 | 8/2006 |
| WO | 2006/095339 | 9/2006 |
| WO | 2006/114728 | 11/2006 |
| WO | 2007/003679 | 1/2007 |
| WO | 2007/004712 | 1/2007 |
| WO | 2007/018291 | 2/2007 |

(56) References Cited

FOREIGN PATENT DOCUMENTS

| WO | 2007/018292 |    | 2/2007  |
|----|-------------|----|---------|
| WO | 2007/019749 |    | 2/2007  |
| WO | 2007/021055 |    | 2/2007  |
| WO | 2008/109011 | A2 | 9/2008  |
| WO | 2009/000357 | A2 | 12/2008 |
| WO | 2009/109962 | A2 | 9/2009  |
| WO | 2011/103627 | A1 | 1/2011  |
| WO | 2011/103626 | A2 | 9/2011  |

OTHER PUBLICATIONS

Gupta, KP. "The Cu—Mg—Ni (Copper-Magnesium-Nickel) System" Journal of Phase Equilibria and Diffusion vol. 25 No. 5 2004 pp. 471-472 (Year: 2004).*

Lambert, S., 'Modification of Cast Mg—Cu Alloys for Hydrogen Storage', Bachelor of Engineering Thesis, The University of Queensland, Nov. 1, 2004.

Akyildiz, H., et al., 'Hydrogen sorption in crystalline and amorphous Mg—Cu thin films', Journal of Alloys and Compounds, 2010, vol. 492, pp. 745-750.

Mezbahul-Islam, M., 'Essential Magnesium Alloys Binary Phase Diagrams and Their Thermochemical Data' Journal of Materials, vol. 2014, Article ID 704283, 33 pages.

Written Opinion of the International Searching Authority from the Australian Patent Office for Application No. PCT/AU2016/050659 dated Oct. 24, 2016.

Gschneidner et al.. Properties of Pure Metals-Mischmetal (MM), ASM Handbook, 1990, ASM International, vol. 2, p. 1.

Kim and Hong, Materials Transactions, 43, 1741-1747, 2002.

Orimo and Fuji, Applied Physics A, 72, 167-186, 2001.

Co-Pending U.S. Appl. No. 11/720,493, filed May 30, 2007 Published as US2009/0123325 on May 14, 2009, granted as U.S. Pat. No. 9,234,264 on Jan. 12, 2016.

Co-Pending U.S. Appl. No. 13/577,358, filed Aug. 6, 2012, Published as US 2012/0298206 on Nov. 29, 2012, granted as U.S. Pat. No. 9,435,489 on Sep. 6, 2016.

Co-Pending U.S. Appl. No. 15/209,132, filed Jul. 13, 3016, Published as US 2017/0030523 on Feb. 2, 2017.

Co-Pending U.S. Appl. No. 13/577,793, filed Aug. 8, 2012, Published as US 2012/0312701 on Dec. 13, 2012.

Japanese Office Action dated Dec. 26, 2014, Application No. 2012-554164.

* cited by examiner

Figure 1 - Mg-Cu binary phase diagram

Figure 2 - Mg-Ni binary phase diagram

Figure 3 - Mg-Si binary phase diagram

Figure 4 – Hydrogen absorption curves at 4th test cycle for some example alloys

Figure 5 – Hydrogen desorption curves at 4th test cycle for some example alloys

Figure 6 - Microstructure of Mg-5.3%Ni-0.34%Si-0.093%Na alloy showing the presence of two distinct eutectic structures

MG-BASED ALLOY FOR HYDROGEN STORAGE

FIELD OF THE INVENTION

This invention relates to a Mg-based alloy capable of being formed by conventional melting and casting techniques and which is suitable for use as a metal hydride-based material suitable for the storage and transportation of hydrogen in the solid state. The disclosed Mg-based alloy has controlled additions of one or more of the following elements: Cu, Na, Ni, and Si. Based on a close understanding of the role played by each element, it is possible to tailor the alloy to achieve a favourable combination of performance attributes, providing attractive hydrogen storage properties compared with other cost-comparable and weight-comparable hydrogen storage materials.

BACKGROUND OF THE INVENTION

As well as being an important industrial gas used in various industrial processing applications, hydrogen is also being seen as an important alternative energy source to carbon-based fossil fuels. The need for safe and suitable storage and transportation devices for hydrogen is therefore increasing. Existing technologies for storing and transporting hydrogen require either: high compression pressures and heavy steel gas cylinders to store hydrogen as a gas, or, extremely low cryogenic temperatures and expensive thermally insulated vessels to store hydrogen as a liquid. Both of these have implicit safety issues. The concept of storing hydrogen gas via a chemical reaction with a suitable solid such that the gas is effectively occluded into the solid and rendered significantly safer is extremely attractive, and much effort has been expended to find a suitable storage material.

It is well known that Mg is capable of storing hydrogen as magnesium hydride ($MgH_2$) at 7.6 mass %. However, the kinetics of the absorption and desorption reactions for pure Mg are too slow for it to be of practical use as a solid state hydrogen storage material. Various methods have been used to improve the adsorption/desorption kinetics of Mg, and hence its practical applicability for use as a storage material. These include one or more of the following approaches: addition of specific elements to provide catalytic benefits (for example, Ni); addition of specific elements to provide a beneficial secondary phase (for example, Zr); refining the microstructure by mechanical means (for example, by ball-milling); refining the microstructure by thermal means (for example, by rapid solidification techniques like melt-spinning); and, producing an amorphous glassy phase by a combination of composition control and thermal means (for example, by high levels of alloying additives combined with rapid cooling rates).

The practical applications for hydrogen storage and transportation systems are many and varied and will continue to emerge and evolve over time. The differing applications are likely to require, or at least be able to benefit from differing combinations of hydrogen storage performance characteristics, for example, longer or shorter activation times, faster or slower absorption rate, faster or slower desorption rate. This may be further coupled with the considerations of relative weight (e.g. mass of $H_2$ stored/mass of storage alloy and equipment) and relative cost (mass of $H_2$ stored/cost of storage alloy and equipment) to convert potential applications into viable commercial realities. One of the ways to control an alloy's performance, weight and cost is through the deliberate tailoring of the alloy composition. In order to do this, it is important to avoid the use of exotic and expensive elements, and of heavy dense elements, in the preferred alloy formulations.

It is also highly desirable that the alternative alloy compositions can be produced economically by commercial casting techniques, rather than expensive and complex formation technologies, such as ball-milling or vapour deposition, that are frequently proposed in the prior art.

It is also desirable that such simply produced alloys require no further post processing actions apart from mechanical fragmentation of the solidified cast alloy to transform it into loose packable material, such as chips or granules.

In general, elements can be classified as being either "eutectic-forming", "peritectic-forming" or "monotectic-forming" with respect to another element species. In this patent application, our main interest is with certain elemental additions that are "eutectic-forming" with Mg (this concept is described below). The elements that are known to form "binary" eutectics with Mg are: Al, Ag, Au, Ba, Bi, Ca, Ce, Cu, Eu, Ga, Gd, Ge, Hg, La, Ni, Pb, Sb, Si, Sm, Sn, Sr, Th, Tl, Y, Yb and Zn. Of these, we focus on only three of these: Cu, Ni and Si. (Note: Na is monotectic-forming with Mg, not a eutectic-forming.)

When an element E that is added to another element (such as Mg in our case) forms a eutectic with the latter element, it is termed a eutectic-forming element. A eutectic is a mixture of two (or more) distinct constituent phases in distinct proportions and with distinct structures. Where a eutectic consists of only two elements and two constituent phases it is called a binary eutectic. A eutectic always has a lower melting point than the two (or more) individual constituent phases that make up the eutectic. The eutectic point is a uniquely defined condition of temperature and alloy composition.

If the eutectic-forming element E is added to another element at an amount that is less than the amount required to attain the eutectic composition of that alloy system, it is said to be an alloy of hypoeutectic composition. Eutectic compositions are well documented in the general literature for almost all two-element alloy systems. In the case of element E being added to molten Mg at a hypoeutectic amount, this will result, upon cooling, in the formation of a Mg solid solution phase first (that is, primary Mg) before the formation of a dual-phase eutectic (a mixture of Mg and an $Mg_xE_y$ intermetallic, where x, y are values determined by the individual phase's atomic and crystalline features).

If the eutectic-forming element E is added at a higher composition than that required to attain the eutectic composition, it is said to be an alloy of hypereutectic composition, and in the case of element E being added to Mg, this will result in the formation of $Mg_xE_y$ intermetallic first (that is, primary $Mg_xE_y$ intermetallic) prior to the formation of the dual-phase eutectic (as noted above).

The distinction between hypoeutectic and hypereutectic alloy compositions is important as the first phase to form determines the main structural skeleton (that is, as crystals, grains or particles) of the alloy, with the eutectic subsequently filling in the gaps in between this primary structure. An alloy structure consisting of a skeleton of primary Mg solid solution is therefore metallurgically different in a substantial way from a structure consisting of a skeleton primary $Mg_xE_y$ intermetallic.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

The inventors have discovered a range of alloys of Mg and at least one of Cu, Si, Ni and Na alloys that is particularly suitable for hydrogen storage applications. The alloys are essentially hypoeutectic with respect to their Cu and Ni contents, where one or both of these elements are present, but range from hypoeutectic through to hypereutectic with respect to their Si content when that element is also present. The terms hypoeutectic and hypereutectic do not apply to Na if it is added to the alloy.

The alloy compositions disclosed provide high performance alloys with regard to their hydrogen storage and kinetic characteristics. They are also able to be formed using conventional casting techniques which are far cheaper and more amenable to commercial use than the alternative ball-milling and rapid solidification techniques which are much more expensive and complex.

Figure 1:
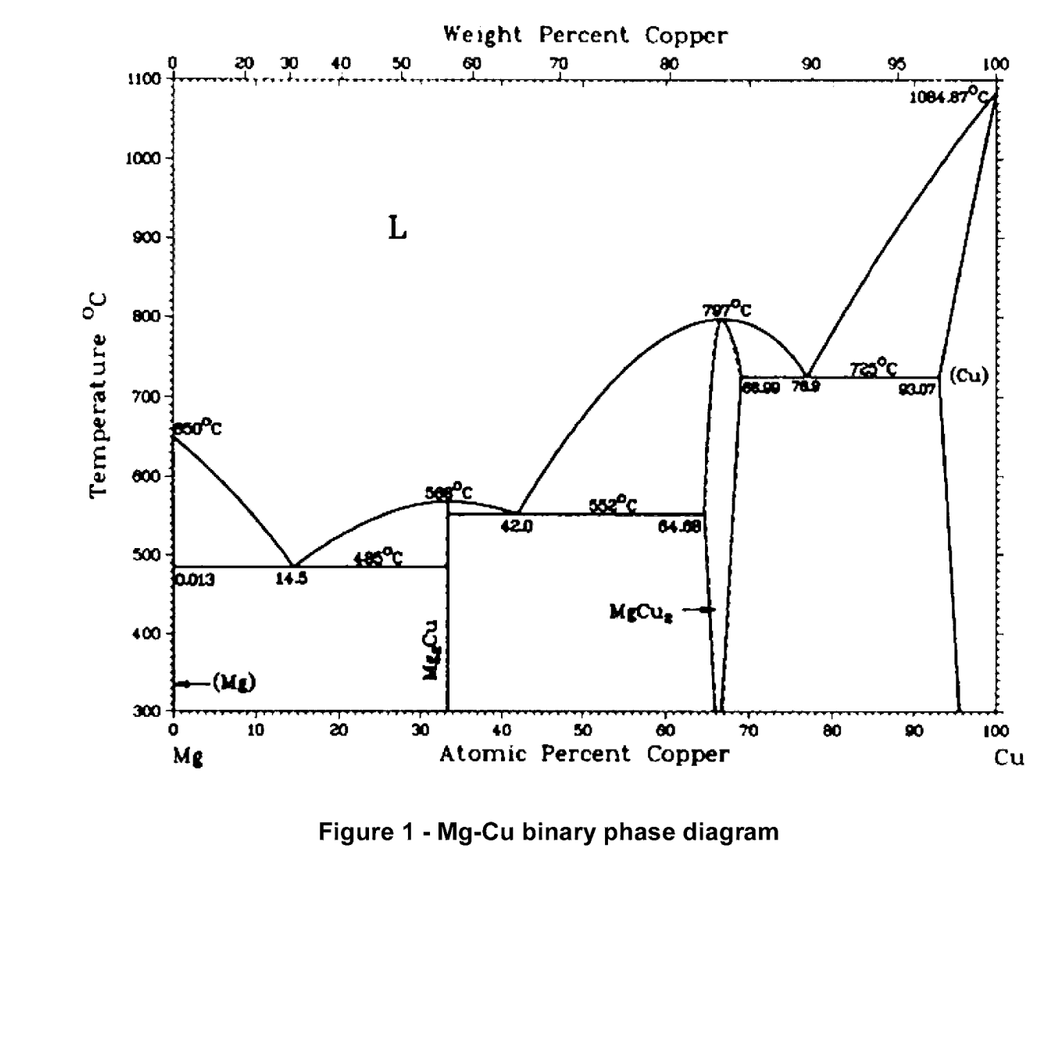
FIG. 1 is a Mg—Cu binary phase diagram.
Figure 2:
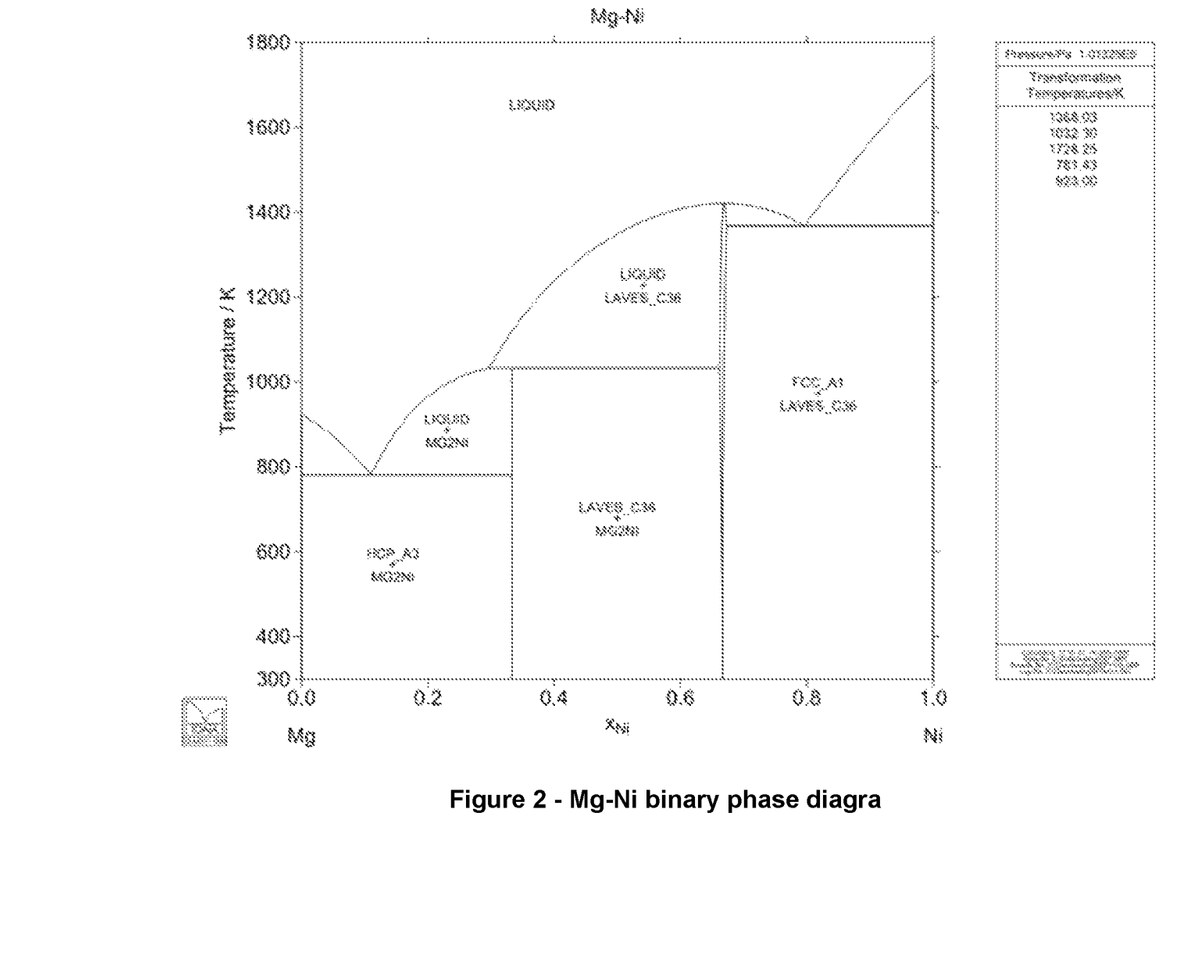
FIG. 2 is a Mg—Ni binary phase diagram.
Figure 3:
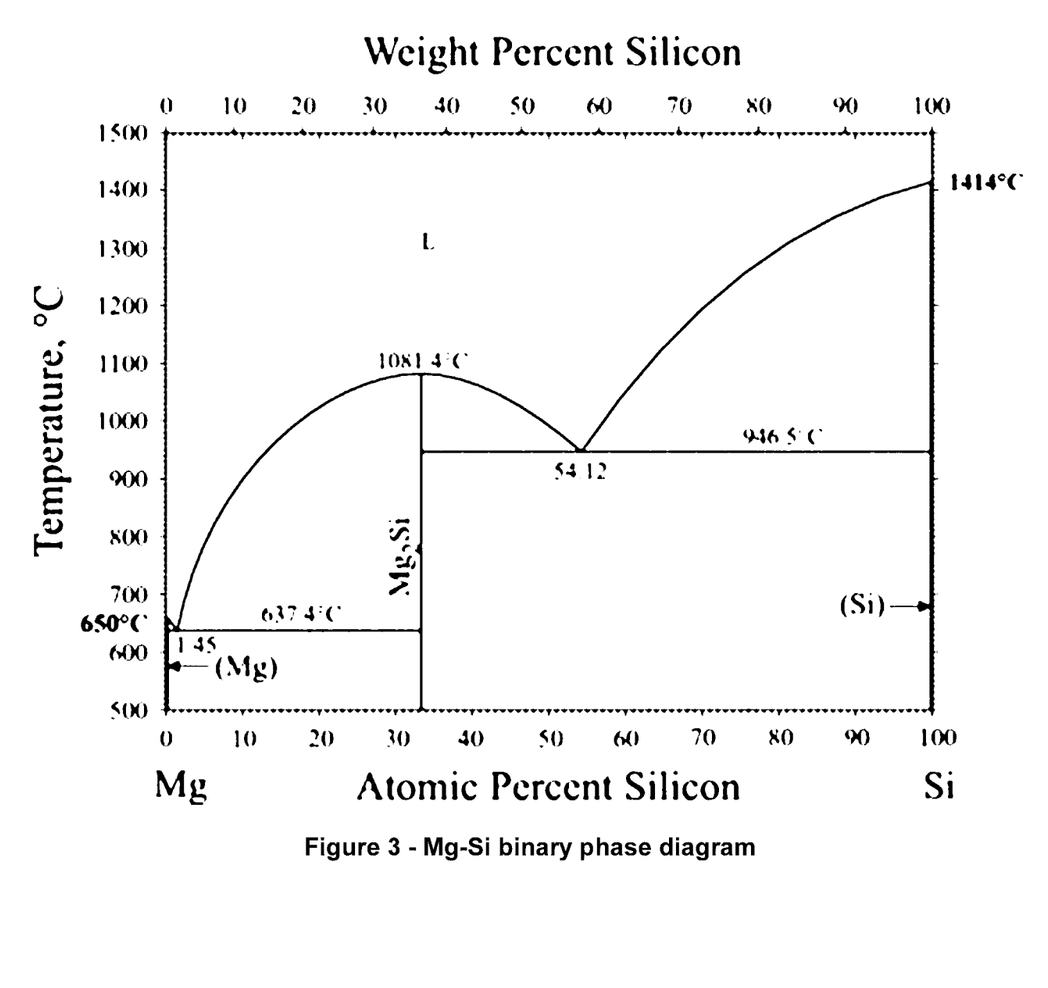
FIG. 3 is a Mg—Si binary phase diagram.

Each of the individual binary Mg-E systems, where E=Cu, Ni or Si, forms a eutectic comprising of Mg metal and a corresponding $Mg_xE_y$ intermetallic phase (FIGS. 1-3). In addition to the ability of Mg metal to absorb hydrogen to form the hydride $MgH_2$, each of the $Mg_xE_y$ intermetallic phases is also able to absorb hydrogen to various degrees to form corresponding hydrides of the form $Mg_aE_bH_c$, or similar.

Note that the other element of interest, Na, does not form a eutectic with Mg, instead it forms a monotectic and exhibits a miscibility gap, meaning that essentially pure elemental Na co-mingles with Mg in which only a small amount of Na is able to be dissolved. This leaves the Na free to interact with the alloy in several possible and interesting ways that are described in detail later.

In a first aspect of the invention there is provided a Mg—Cu based alloy that is able to be formed by commercial casting methods and which is suitable for hydrogen storage applications and which consists essentially of:
  i. an amount of Cu such that the alloy is hypoeutectic with respect to Cu content, that is greater than zero and less than 32 mass % Cu; more preferably with Cu content between 0.1 mass % and 9 mass %; and, most preferably Cu between 0.1 mass % and 5.5 mass %; and optionally an amount of Ni such that the alloy is hypoeutectic with respect to Ni content, that is zero or greater than zero and less than 23.5 mass % Ni;
  ii. an amount of Na from zero and up to 2 mass % Na (20,000 ppm, that is, parts per million), more preferably at a level between 200 and 4,000 ppm; and, most preferably a level between 800 and 2,000 ppm;
  iii. incidental impurities totalling less than 0.5 mass %; and
  iv. the balance of the alloy mass being Mg,
    the alloy having a primary (initially formed) crystallized Mg phase and a subsequently crystallized Mg—Cu based eutectic.

In a second aspect of the invention, there is provided a Mg—Si based alloy that is able to be formed by commercial casting methods and which is suitable for hydrogen storage applications and which consists essentially of:
  i. (a) an amount of Si such that the Mg—Si alloy is hypoeutectic with respect to Si content, that is greater than zero and less than 1.34 mass % Si; or
  (b) an amount of Si such that the alloy is hypereutectic with respect to Si content, that is greater than 1.34 mass % and less than 36.6 mass % Si;
  ii. optionally at least one of an amount of Ni such that the alloy is hypoeutectic with respect to Ni content, that is zero, greater than zero and less than 23.5 mass % Ni; and an amount of Cu such that the alloy is hypoeutectic with respect to Cu content, that is zero, greater than zero and less than 32 mass % Cu;
  iii. an amount of Na from zero and up to 2 mass % Na (20,000 ppm), more preferably at a level between 200 and 4,000 ppm; and, most preferably a level between 800 and 2,000 ppm;
  iv. incidental impurities totalling less than 0.5 mass %; and
  v. the balance of the mass being Mg,
    the alloy having a primary crystallized Mg phase and a subsequently crystallized Mg—Si based eutectic.

A third aspect of the invention provides the above Mg—Si based alloy of the second aspect where
  the amount of Si is such that the alloy is hypereutectic with respect to Si content; and
  optionally consists of at least one of an amount of Ni such that the alloy is hypoeutectic with respect to Ni content, that is zero or greater than zero and less than 23.5 mass % Ni; and an amount of Cu such that the alloy is hypoeutectic with respect to Cu content, that is zero or greater than zero and less than 32 mass % Cu;
  the alloy having primary crystallized $Mg_2Si$ intermetallic phase and a subsequently crystallized Mg—Si based eutectic.

A fourth aspect of the invention provides the Mg—Si alloy of the second aspect where
  the amount of Si is such that the alloy is hypoeutectic with respect to Si content, that is greater than zero and less than 1.34 mass % Si; more preferably with Si content between 0.1 mass % and 1.34 mass %; and, most preferably Si between 0.2 mass % and 1.34 mass %; and
  optionally at least one of an amount of Ni such that the alloy is hypoeutectic with respect to Ni content, that is zero or greater than zero and less than 23.5 mass % Ni and an amount of Cu such that the alloy is hypoeutectic with respect to Cu content, that is zero or greater than zero and less than 32 mass % Cu.

A fifth aspect provides a Mg—Cu—Ni based alloy consisting essentially of the Mg—Cu alloy of the third aspect having
  amount of Ni being such that the alloy is hypoeutectic with respect to Ni content, that is greater than zero and less than 23.5 mass % Ni; more preferably with Ni content between 0.1 mass % and 9 mass %; and, most preferably Ni between 0.1 mass % and 5.5 mass %;
  the alloy having a primary crystallized Mg phase and a subsequently crystallized mixture of one or more of Mg—Cu based eutectic, Mg—Ni based eutectic and Mg—Cu—Ni based eutectic.

In a sixth aspect of the invention, there is provided a Mg—Cu—Si based alloy consists essentially of the Mg—Si alloy of the fourth aspect having
  an amount of Cu is such that the alloy is hypoeutectic with respect to Cu content, that is greater than zero and less than 32 mass % Cu; more preferably with Cu content between 0.1 mass % and 7 mass %; and, most preferably Cu between 0.1 mass % and 4.5 mass %; and an amount of Na from zero and up to 2 mass % Na (20,000 ppm); more preferably at a level between 200 and 4,000 ppm; and, most preferably a level between 800 and 2,000 ppm;

the alloy having a primary crystallized Mg phase and a subsequently crystallized mixture of one or more of Mg—Cu based eutectic, Mg—Si based eutectic and Mg—Cu—Si based eutectic.

In a seventh aspect of the invention there is provided a Mg—Cu—Si based alloy which consists essentially of the Mg—Si alloy of the third aspect where the an amount of Cu such that the alloy is hypoeutectic with respect to Cu content, that is greater than zero and less than 32 mass % Cu; more preferably with Cu content between 0.1 mass % and 7 mass %; and, most preferably Cu between 0.1 mass % and 4.5 mass %;

an amount of Na from zero and up to 2 mass % Na (20,000 ppm); more preferably at a level between 200 and 4,000 ppm; and, most preferably a level between 800 and 2,000 ppm;

and optionally an amount of Ni such that the alloy is hypoeutectic with respect to Ni content, that is zero, greater than zero and less than 23.5 mass % Ni;

the alloy having a primary crystallized $Mg_2Si$ intermetallic phase and a subsequently crystallized mixture of one or more of Mg—Cu based eutectic, Mg—Si based eutectic and Mg—Cu—Si based eutectic.

In an eighth aspect of the invention there is provided a Mg—Ni—Si based alloy which consists essentially of the Mg—Si alloy of the fourth aspect where the amount of Ni is such that the alloy is hypoeutectic with respect to Ni content, that is greater than zero and less than 23.5 mass % Ni; and an amount of Si such that the Mg—Ni—Si alloy is hypoeutectic with respect to Si content, that is greater than zero and less than 1.34 mass % Si;

an amount of Na from zero and up to 2 mass % Na (20,000 ppm); more preferably at a level between 200 and 4,000 ppm; and, most preferably a level between 800 and 2,000 ppm; and optionally an amount of Cu such that the alloy is hypoeutectic with respect to Cu content, that is zero or greater than zero and less than 32 mass % Cu;

the alloy having a primary crystallized Mg phase and a subsequently crystallized mixture of one or more of Mg—Ni based eutectic, Mg—Si based eutectic and Mg—Ni—Si based eutectic.

In a ninth aspect of the invention there is provided a Mg—Ni—Si based alloy which consists essentially of the Mg—Si alloy of the third aspect where the amount of Ni is such that the alloy is hypoeutectic with respect to Ni content, that is greater than zero and less than 23.5 mass % Ni; more preferably with Ni content between 0.1 mass % and 7 mass %; and, most preferably Ni between 0.1 mass % and 3.5 mass %;

the alloy having a primary crystallized $Mg_2Si$ intermetallic phase and a subsequently crystallized mixture of one or more of Mg—Ni based eutectic, Mg—Si based eutectic and Mg—Ni—Si based eutectic.

In a tenth aspect of the invention there is provided a Mg—Cu—Ni—Si based alloy which consists essentially of the Mg—Ni—Si alloy of the ninth aspect where the amount of Cu is such that the alloy is hypoeutectic with respect to Cu content, that is greater than zero and less than 32 mass % Cu; more preferably with Cu content between 0.1 mass % and 7 mass %; and, most preferably Cu between 0.1 mass % and 4.5 mass %; and the amount of Ni is such that the Mg—Cu—Ni—Si alloy is hypoeutectic with respect to Ni content, that is greater than zero and less than 23.5 mass % Ni; more preferably with Ni content between 0.1 mass % and 7 mass %; and, most preferably Ni between 0.1 mass % and 4.5 mass %;

the alloy having a primary crystallized Mg phase and a subsequently crystallized mixture of one or more of Mg—Cu based eutectic, Mg—Ni based eutectic, Mg—Si based eutectic, Mg—Cu—Si based eutectic, Mg—Cu—Ni based eutectic, Mg—Ni—Si based eutectic and Mg—Cu—Ni—Si based eutectic.

In an eleventh aspect of the invention there is provided a Mg—Cu—Ni—Si based alloy which consists essentially of the Mg—Cu—Si alloy of the seventh aspect the amount of Ni is such that the Mg—Cu—Ni—Si alloy is hypoeutectic with respect to Ni content, that is greater than zero and less than 23.5 mass % Ni; more preferably with Ni content between 0.1 mass % and 7 mass %; and, most preferably Ni between 0.1 mass % and 4.5 mass %;

the alloy having a primary crystallized $Mg_2Si$ phase and a subsequently crystallized mixture of one or more of Mg—Cu based eutectic, Mg—Ni based eutectic, Mg—Si based eutectic, Mg—Cu—Si based eutectic, Mg—Cu—Ni based eutectic, Mg—Ni—Si based eutectic and Mg—Cu—Ni—Si based eutectic.

Table 1 provides a table of important alloy system data pertaining to individual Mg—Cu, Mg—Ni and Mg—Si binary eutectic systems. From this data, those skilled in the art can determine for any given composition, the types, compositions and amounts of the primary Mg, primary intermetallic and secondary eutectic phases (both the Mg and corresponding intermetallic constituents) that will form during the solidification of the alloy. Thus, by choice of composition it is possible to design an alloy composition to contain specific amounts (either by mass % or volume %) of Mg and each type of binary intermetallic (assuming the binary eutectics form more or less independently of each other, and that ternary eutectic formation does not dominate in the alloy system).

Each of the elements noted above have their own different effects on the hydrogen storage properties of Mg and its alloy derivatives. In addition, each element carries its own weight benefit or penalty (since they each affect alloy density) and its own cost benefit or penalty per percentage point of the element added. Knowledge of these effects allows for tailoring of alloy composition to meet the requirements of specific applications. Some of the discovered elemental effects on hydrogen storage properties are as follows:

The presence of Ni in Mg shortens the activation time required before hydrogen begins to be absorbed, that is, for the alloy to become activated. It also increases the hydrogen absorption and desorption rates during repeated cycling. However, it is noted that Ni is a relatively expensive element that is subject to price volatility.

Figure 4:
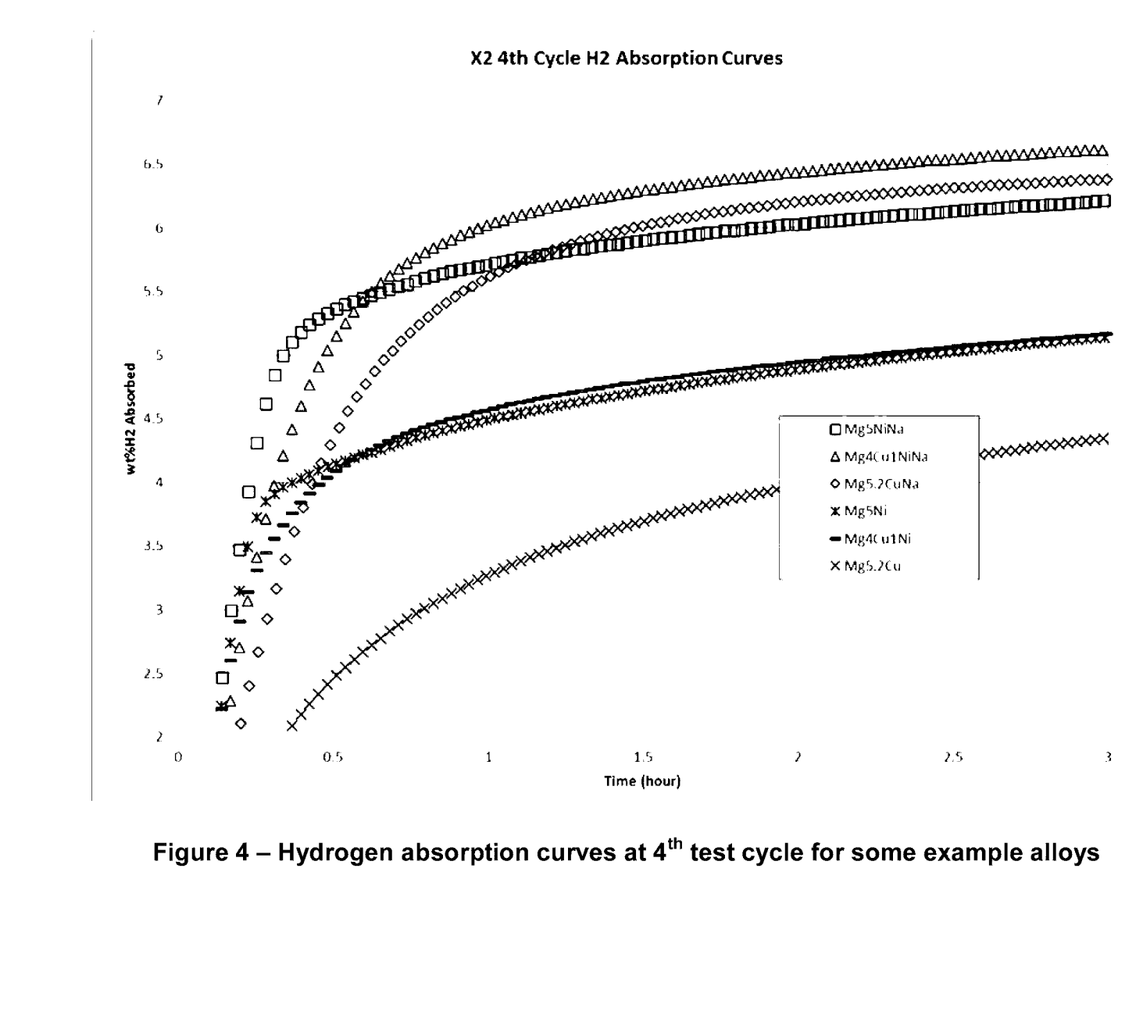
FIG. 4 is a graph of hydrogen absorption curves at $4^{th}$ test cycle for some of the alloys described in examples 2, 6 and 7 (see Table 3 also)
Figure 5:
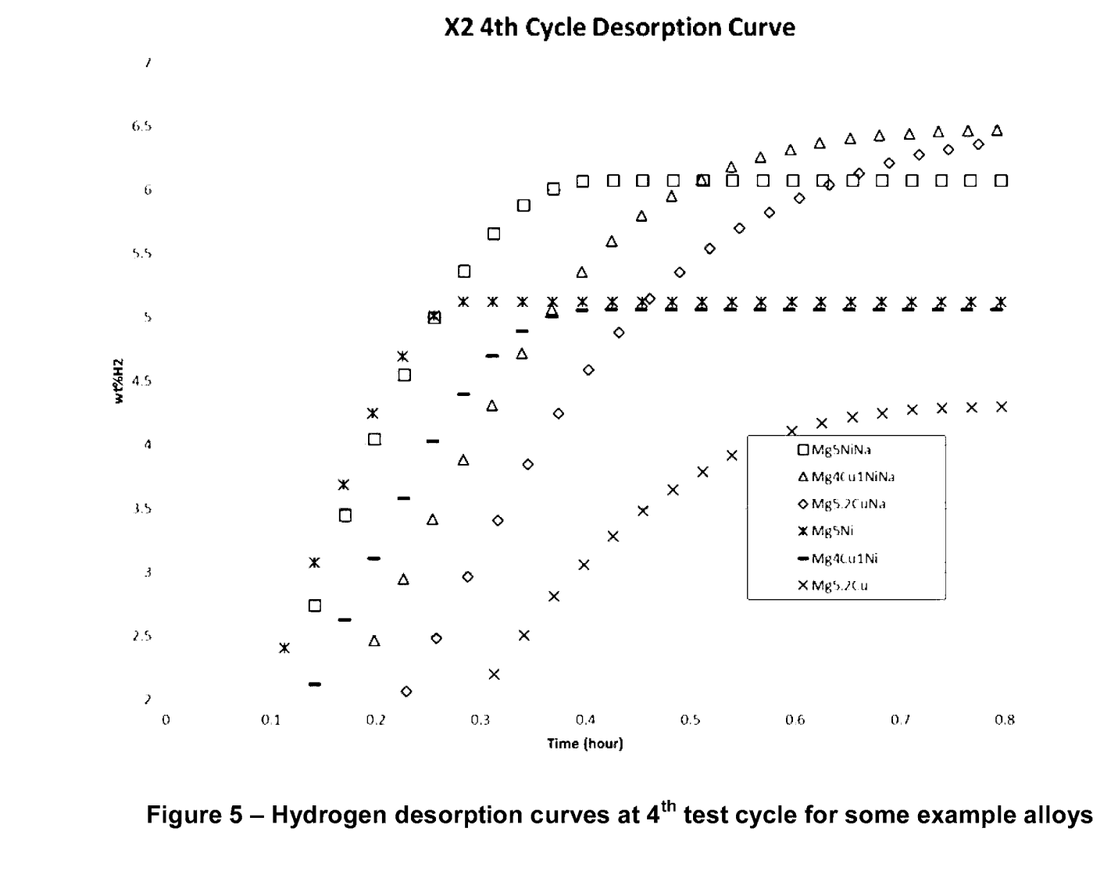
FIG. 5 is a graph of hydrogen desorption curves at $4^{th}$ test cycle for some of the alloys described in examples 2, 6 and 7 (see Table 3 also); and, FIG. 6 is a micrograph (SEM) showing the microstructure of a Mg-5.3% Ni-0.34% Si-0.093% Na alloy showing the presence of two distinct eutectic structures.

The presence of Cu in Mg has been discovered to improve the overall hydrogen absorption rate during the first hour of each repeated absorption/desorption cycles, compared to an equivalent addition amount of Ni (FIG. 4), but to impair the hydrogen desorption rate (FIG. 5). For applications where desorption rate is non-critical, Cu, as a cheaper metal than Ni, offers the potential for reduced alloy cost compared to Ni, and thus the opportunity to tailor the storage material composition such that the economics of the specific application are improved and made more commercially viable.

The presence of Si in Mg provides some improvement in activation time but in the binary alloy system the hydrogen storage capacity remains low compared to additions of Cu and Ni, unless Na is also added in which case both activation time and storage capacity are improved to acceptable levels for less demanding performance applications. Furthermore, because Si is much lighter and cheaper than either Cu or Ni, and since it is capable of forming large amounts of beneficial eutectic phase even at low addition levels, for example, below 1.34 mass % (the eutectic composition, see Table 1), Mg—Si alloys potentially lend themselves to applications where weight and cost reductions are paramount.

It has further been found that the presence of Si in Mg—Ni alloy (with or without Na), even at levels below 1.34 mass %, improves hydrogen storage capacity in low Ni content alloys. This effect appears to be due to its influence on microstructure (FIG. 6), the large amounts of $Mg_2Si$ intermetallic increasing the diffusion pathways for hydrogen atoms within the Mg grains. We have also discovered that the presence of Si in Mg—Cu alloy with various Cu contents, even at levels below 1.34 mass %, improves hydrogen storage capacity.

The alloy structures and compositions claimed above (and tabulated in Table 2) are capable of providing alloy hydrogen storage characteristics that are comparable to or better than those obtained using ball-milled Mg-alloy material, in particular when considered from an economic perspective.

TABLE 1

Important alloy system data for Cu, Ni and Si added to Mg

| Added Element (E) | Max. solid solubility of E in Mg (mass %) | Eutectic composition (mass % of E) | Intermetallic formed in eutectic | Amount of E in intermetallic (mass %) |
|---|---|---|---|---|
| Cu | ~0 | 32.0 | $Mg_2Cu$ | 56.7 |
| Ni | ~0 | 23.5 | $Mg_2Ni$ | 54.7 |
| Si | ~0 | 1.34 | $Mg_2Si$ | 36.6 |

TABLE 2

Ranges of alloying element additions claimed in the invention

| Added Element (E) | with other elements | Max. range (mass %) | More preferred range (mass %) | Most preferred range (mass %) |
|---|---|---|---|---|
| Cu | alone; | >0-32.0 | 1-9 | 2-6 |
|  | +Ni; |  | 0.1-9 | 0.1-5.5 |
|  | +Si; +Ni + Si |  | 0.1-7 | 0.1-4.5 |
| Ni | +Cu; | >0-23.5 | 0.1-9 | 0.1-5.5 |
|  | +Si; +Cu + Si |  | 0.1-7 | 0.1-4.5 |
| Si (hypo) | alone | >0-1.34 | — | — |
|  | +Cu; +Ni; +Cu + Ni | >0-1.34 | 0.1-1.34 | 0.2-1.34 |
| Si (hyper) | alone; +Cu; +Ni; +Cu + Ni | 1.34-36.6 | 1.34-7 | 1.34-3.5 |
| Na | any comb'n | 0-20,000 ppm | 200-4,000 ppm | 800-2,000 ppm |

Note:
In Table 2, three eutectic-forming elements (Cu, Ni and Si) are considered in various combinations. Na is not a eutectic-forming element, but may be added to any of the element combinations listed to achieve various outcomes. In all cases, Mg forms the balance of the alloy composition, with the exception of up to 0.5% impurities.

Each of the above claimed alloys containing one or more of the eutectic-forming elements, Cu, Ni and Si, is capable of acting as a hydrogen storage alloy but we have further discovered that the hydrogen storage performance of each may be further enhanced by the presence of Na addition which appears to perform one or more of several functions. For example, Na improves activation performance and alloy processing characteristics. Not wishing to be bound by theory, it may achieve these affects by:

Refining the microstructure of the eutectic;

Altering the nature of the oxide surface that develops on the alloy, thereby affecting the hydrogen transfer rate across the alloy-gas interface;

Providing its own catalytic function in terms of enhanced hydrogen kinetics, independent of that provided by any of the other elements;

Providing a Na-enriched layer around grains and in the interdendritic spaces that enhances transport of hydrogen through the alloy; or Providing a layer (as above) that causes brittleness in the alloy and which in turn enhances the mechanical fragmentation of the alloy to a fine scale, thus improving transport of hydrogen through the alloy by a different means.

The alloy invention is described in more detail in a subsequent section.

DETAILED DESCRIPTION OF THE EMBODIMENTS

The alloy compositions disclosed provide high performance alloys with regard to their hydrogen storage and kinetic characteristics. They are also able to be formed using conventional casting techniques which are far cheaper and more amenable to commercial use than the alternative ball-milling and rapid solidification techniques which are much more expensive and complex.

Each of the individual binary Mg-E systems, where E=Cu, Ni or Si, forms a eutectic comprising of Mg metal and a corresponding $Mg_xE_y$ intermetallic phase (FIGS. 1-3). In addition to the ability of Mg metal to absorb hydrogen to form the hydride $MgH_2$, each of the $Mg_xE_y$ intermetallic phases is also able to absorb hydrogen to various degrees to form corresponding hydrides of the form $Mg_aE_bH_c$, or similar.

The alloy structures and compositions described above (and illustrated in Table 2) are capable of providing alloy hydrogen storage characteristics that are comparable to or better than those obtained using ball-milled Mg-alloy material. In particular, in terms of specific test values such as effective peak hydrogen (EPH), expressed in mass % $H_2$. This value is measured after repeated absorption and desorption cycles, typically four cycles, carried out at approximately 350° C./10-15 bar and 350° C./1-2 bar, respectively.

(Note: other important test values include the initial activation time, that is, the delay or incubation period before hydrogen absorption starts to occur during the first test cycle, and the saturation hydrogen level achieved after the initial 20 hour period.) These excellent hydrogen storage characteristics are achieved without the use of expensive and exotic elemental additions such as Pd, without the need for very high addition levels of Ni and Cu into the hypereutectic range, and without the need for complex and expensive alloy forming methods. Rather, each of the claimed alloys compositions is capable of being made using conventional casting techniques.

The alloy compositions described and claimed are also capable of providing hydrogen absorption and desorption rates that differ from those of Mg—Ni—Na alloy, thus allowing the compositions of the alloys to be tailored to performance levels suitable for specific applications, and which are superior on a weight-for-weight basis, or a cost-for-cost basis cost, or to some other similar customer-based or production-based comparative parameter.

Certain Mg alloys that contain eutectic forming elements, such as Ni, have far superior hydrogen storage characteristics compared to pure Mg metal. It has consequently been found that it is the presence of the eutectic intermetallic phases, for example $Mg_2Ni$, that provide this benefit by: acting as catalysts for hydrogen storage in Mg, providing alternative hydriding phases, and/or providing easy physical pathways for the transport of hydrogen atoms.

Given this understanding it is not surprising that one skilled in the art might predict that any of the eutectic forming elements (that is, Al, Ag, Au, Ba, Bi, Ca, Ce, Cu, Eu, Ga, Gd, Ge, Hg, La, Ni, Pb, Sb, Si, Sm, Sn, Sr, Th, Tl, Y, Yb and Zn) or combinations thereof should substantially improve the hydrogen storage characteristics of Mg.

However, this is not the case as is demonstrated by the example of a Mg—Al—Ca alloy given below. It is noted that Al and Ca are both eutectic-forming with Mg, and form these eutectics at 33 mass % and 16.2 mass % of the element, respectively. These values should be compared with the eutectic value of 23.5 mass % for Ni, which is midway between these two.

Note that in all the examples presented below, alloy compositions and EPH values are expressed in mass % values, unless otherwise stated. The data described in the examples is also tabulated in Table 3 for ease of comparison.

Example 1

Mg-5 mass % Al-3 mass % Ca alloy (without Na and with a nominal addition of 2000 parts per million by mass [that is, 2000 ppm or 0.2 mass %] of Na) was melted and cast into a metallic mould and then tested for hydrogen storage properties. This alloy contains a comparable total mass % of eutectic elements (in this case, 8 mass %) as a commercial Mg—Ni alloy, and based on the eutectic compositions should also form a similar amount of eutectic and intermetallic compounds as the commercial Mg—Ni alloy.

The alloy without Na addition performed extremely poorly with an activation time of 15 hours and a cyclic EPH value of 1.1 mass % $H_2$. This was improved with the nominal addition of 2000 ppm Na yielding a shortened activation time of 8 hours and an increased cyclic EPH value of 3.7 mass %. Although this demonstrates a clear positive benefit for a Na addition to an otherwise poor alloy, the improved values still fall well short of a high performance alloy with a zero activation time and an EPH value of approximately 6.5 mass % $H_2$.

It is evident from this example that it is not simply a matter of arbitrarily picking a eutectic element, or combinations of eutectic elements, and then randomly choosing an addition amount(s) to obtain improved hydrogen storage characteristics in an Mg-based alloy. Rather, a substantial degree of inventiveness is required in order to identify and optimise superior alloy compositions. The inventiveness flows from determining and understanding the features that individual elements and combinations of particular elements contribute to hydrogen storage performance and other process-related and application-related parameters.

This patent application discloses an improved set of Mg-based hydrogen storage alloys that are carefully prepared using selected amounts of subsets of the aforementioned eutectic forming elements, sometimes in conjunction with Na added as a performance-enhancing element. These alloys are described and illustrated in examples in more detail below.

Cu Added to Mg

As noted in an earlier section, the main effect of Cu in Mg is to improve the kinetics of hydrogen activation, hydrogen absorption rate and hydrogen desorption rate over that of pure Mg. It is believed that Cu does this by acting as a catalyst that facilitates the breakdown of hydrogen gas into hydrogen atoms and facilitates the transport of those atoms into the Mg where they react and form as solid hydrides, for example, $MgH_2$. In addition, Cu provides a layered eutectic structure of Mg and $Mg_2Cu$ intermetallic that surrounds and interpenetrates the primary Mg grains and which provides easy transport paths for hydrogen atoms to reach their reaction sites, which may be with primary Mg grains or with the $Mg_2Cu$ intermetallic constituent in the eutectic.

We have observed that Cu is similar in effect to Ni (a well-known addition to Mg for hydrogen storage purposes) but that its performance is asymmetric with respect to Ni. In particular, Cu provides an improved overall rate of hydrogen absorption after the first hour compared to a similar mass % addition of Ni, even though Ni displays a more accelerated initial stage of absorption (FIG. 4). However, Cu shows a slower rate of hydrogen desorption compared to a similar mass % addition of Ni, but it does this with no loss of EPH storage capacity. Since Cu is a lower cost element than Ni, it is clear that Cu may be beneficially used rather than Ni for applications in which the desorption rate is less critical than the absorption rate.

We have further found that the addition of Na to Mg—Cu alloys (Mg-5.2% Cu, Mg-14% Cu, Mg-20% Cu) enhances the hydrogen storage characteristics, in particular, providing consistent improvements in effective peak hydrogen levels (to values as high as 6.3%). It also improves cycling kinetics, and in general reduces the activation time for hydrogen absorption to commence. It is specifically found that Na substantially improves hydrogen desorption rates during cycling (thus ameliorating the slower desorption rate noted above for binary Mg—Cu alloys), compared to Mg—Ni alloys in which Na additions tend to improve the hydrogen adsorption rate instead.

Example 2

Mg-5.2% Cu alloy has been tested and found to have an EPH value of 4.3% under the previously noted conditions.

The nominal addition of 2000 ppm of Na to the alloy significantly raises the EPH of the alloy to 6.4%, a highly acceptable and commercially-useful level.

Si Added to Mg

Although Cu, Ni and Si are each eutectic-forming elements with Mg, silicon differs from Cu and Ni in that it is both lightweight and cheap, and also exhibits its eutectic point at a very low addition level, 1.3% Si. This means that a high proportion of eutectic structure can be achieved with relatively small additions of silicon. Such a microstructure has large amounts of interfacial area between the phases through which hydrogen transport can easily take place.

In addition, by exceeding 1.3% Si, the formation of primary $Mg_2Si$ intermetallic phase particles can be facilitated should this be considered a desirable structural feature to further increase options for hydrogen transport pathways. This latter device is not possible in Mg—Cu or Mg—Ni alloys without adding significantly larger amounts (greater than 32% and greater than 23.5%, respectively) of these heavy elements. We have found that the addition of even relatively small amounts of Si to the alloy, for example, approximately 0.2%, also improve the chip formation process achieved during mechanical processing of the alloy, which is a significant processing benefit.

As a sole addition, Si is not as effective in as Cu or Ni in shortening activation time or in increasing absorption or desorption rates. However, the addition of Na to Mg—Si binary alloy has significant positive impacts on certain performance aspects, as shown in the following examples.

Example 3

In a hypoeutectic Mg-0.5% Si alloy, a nominal Na addition of 2000 ppm did not change activation time (which remained at 5 hrs), but did improve the hydrogen cycling kinetics resulting in an improved multiple cycle EPH value of 5.2% $H_2$ (with Na) compared to 4.0 (without Na). This improvement was achieved despite the Na addition not providing any significant microstructural refinement to the eutectic. This is a surprising finding given that microstructural refinement has been generally accepted as the key mechanism behind improved performance in eutectic-based alloys. Clearly, Na is able to provide benefits for hydrogen storage via more than this one mechanism.

Example 4

There are also measurable benefits of adding Na to Mg alloys with hypereutectic Si levels, i.e. above 1.34% Si. For example, for a Mg-1.6% Si alloy, although the activation times were still long with a nominal 2000 ppm Na addition (18 hrs compared to >20 hrs without Na) the multiple cycle EPH value was dramatically increased from 0 to 5.1% $H_2$ with the addition of Na.

Example 5

Furthermore, we have found that increasing the Si content of the alloy to 2.1% resulted in a decreased activation time of 6 hours and an increased cyclic EPH of 2.6% even without addition of Na. When Na is added at nominal 2000 ppm level to the Mg-2.1% Si alloy, the activation time dropped to 3 hours and the cyclic EPH rose to 5.5%.

Cu and Ni Added to Mg

We have already compared Mg—Cu alloy with the Mg—Ni alloy and shown that Cu and Ni exhibit differing responses to their hydrogen absorption and desorption kinetics. This surprising observation suggested to us the beneficial use of Mg—Cu as a replacement for Mg—Ni in applications where desorption rates were not critical but where cost was the more important driver.

From this insight, we have hypothesised, investigated and determined that Ni can be added to a Mg—Cu alloy (or vice versa) such that at particular mass % combinations of the elements not only are the counter-effects offset, but improved hydrogen storage capacity during cycling may be achieved. Our claimed preferred composition ranges reflect these findings. In fact, the best hydrogen capacity is achieved at relatively low overall alloy addition levels (for example, Mg-4% Cu-1% Ni, compared with existing higher levels of Ni used commercially). We can therefore tailor Mg—Cu—Ni alloy compositions to provide improved properties at potentially reduced alloy weight and alloy cost.

We have further found that Na improves the overall performance of Mg—Cu—Ni alloys, presumably among other things, by Na acting to improve the reduced hydrogen desorption rates caused by Cu (thus ameliorating the rate loss noted above) compared with Mg—Ni alloys in which Na additions tend to improve the hydrogen adsorption rate. We have found that the benefit of Na is conferred especially at particular mass % combinations of Cu and Ni additions.

Example 6

It has been determined that a Mg-5.2% Cu alloy (without Na) has a multiple cycle EPH value of 4.3% $H_2$. When some of the Cu is substituted by Ni, as in the Mg-4% Cu-1% Ni alloy (without Na), the EPH value is improved to 5.1%. A further nominal addition of 2000 ppm Na to the alloys raises the EPH of the nominal Mg-4% Cu-1% Ni alloy to 6.5%, which is higher than the EPH values achieved for either the Mg-5.2% Cu alloy with Na addition or a Mg-4.7% Ni alloy with Na, which were measured at 6.4% and 6.3% respectively.

Example 7

Surprisingly, a nominal addition of 2000 ppm Na to the nominal Mg-4% Cu-1% Ni alloy (approximately 5% total alloy content) yields a greater improvement to EPH value (5.1 to 6.5%) than the same Na addition does to a nominal Mg-3.5% Cu-3.5% Ni alloy (approximately 7% total alloy content) where EPH is improved from 5.1 to 6.0%. Not only does this demonstrate that a leaner composition alloy can have as good a hydrogen capacity as a richer composition alloy, but that Na clearly has other positive effects on EPH that are independent of any beneficial effects that it has on the Mg—Cu and Mg—Ni based eutectics present in the structure.

TABLE 3

Composition and hydrogen performance data for various Cu—Ni Compositions

| Cu—Ni Related Compositions with no Na | | | | | Cu—Ni Related Compositions with Na Added | | | | |
|---|---|---|---|---|---|---|---|---|---|
| Cu | Ni | Si | Act'vtion | EPH4 | Cu | Ni | Si | Act'vtion | EPH4 |
| 3.6 | 0.9 | | 4 | 5.1 | 3.9 | 1 | | 0 | 6.5 |
| 5.2 | 0 | | 7 | 4.3 | 5.2 | 0 | | 3 | 6.4 |
| | | | | | 0 | 4.7 | | 0 | 6.3 |
| 2.6 | 2.6 | | 5 | 4.6 | 2.4 | 2.5 | | 4 | 6.2 |
| | | | | | 2.45 | 0.98 | | 0 | 6.2 |
| 10 | 0 | | 5 | 3.4 | 14 | 0 | | 4 | 6.0 |
| 3.5 | 3.7 | | 5 | 5.1 | 3.2 | 3.3 | | 2 | 6.0 |
| 9 | 5 | | 2 | 5.5 | 9 | 5 | | 5 | 5.9 |
| 6.8 | 6.5 | | 1 | 5.1 | 6.8 | 6.5 | | 1 | 5.8 |
| | | | | | 1 | 2.5 | | 4 | 5.8 |
| 2.62 | 0.99 | 0.36 | 10 | 2.1 | 2.56 | 0.98 | 0.36 | 3 | 5.8 |
| 3.5 | 0 | | 12 | 2.7 | 3.5 | 0 | | 4 | 5.7 |
| 5 | 9 | | 6 | 4.9 | 5 | 9 | | 2 | 5.7 |
| | | | | | 0 | 14 | | 2 | 5.5 |
| | | | | | 1 | 1 | | 0 | 5.3 |
| 11 | 0 | | 2 | 5.3 | 24 | 0 | | 2 | 4.7 |
| 0 | 14 | | 6 | 5.1 | 0 | 2.58 | | 2 | 4.7 |
| 0 | 4.7 | | 6 | 5.1 | 0 | 1.3 | | 3.5 | 3.5 |

Cu and Si Added to Mg

The addition of Cu and Si together to Mg does not appear to provide any substantial improvement to hydrogen storage capacity compared to that achieved in the simple binary Mg—Cu or Mg—Si alloys. However, the combination of adding Cu and Si together in Mg improves the responsiveness of the alloy to a Na addition and achieves greater increase in the EPH values compared to the effect of Na added to either of the simple binary alloys, even though it may not achieve the highest EPH value in the ternary alloy. This is a surprising result that could not be predicted a priori.

Nevertheless, when the addition of Si to Mg—Cu alloys (particularly where the amount of Si added is a direct substitute for some of the Cu content) results in hydrogen storage characteristics that are similar to the binary Mg—Cu alloy then a commercially attractive alloy has been formulated. This is because silicon is much cheaper and is much less dense than Cu, and is also cheaper than Mg, resulting in a potentially cost-effective and weight-effective alloy for less demanding hydrogen storage applications.

This is believed to occur because Si, even at relatively small addition levels, dramatically increases the amount of eutectic intermetallic particles present in the microstructure thus increasing the interfacial area available for transport of hydrogen atoms. It is believed that Na tends to segregate to these interfaces and that its presence facilitates the transport of hydrogen to the key reaction and absorption sites provided by the primary Mg phase and the Mg—Cu eutectic, rather than the less responsive Mg—Si eutectic.

Example 8

As noted above, it has been determined that a Mg-5.2% Cu alloy (without Na) has a multiple cycle EPH value of 4.3% $H_2$. When some of the Cu is substituted by Si, as in the Mg-4% Cu-1% Si alloy (without Na), the EPH value is decreased to 2.6%. However, a nominal addition of 2000 ppm Na to the alloys raises the EPH of the nominal Mg-4% Cu-1% Si alloy to 6.2%, which is a substantially greater increase (+3.6%) in EPH value, compared to that achieved in Mg-5.2% Cu alloy, that only achieves a +2.1% increase to an EPH of 6.4%.

Review of the data for Mg—Cu—Si alloys (Na-added) shows that for copper-rich alloys with reducing silicon contents, the EPH reduces significantly as the copper concentration drops, and this reduction is not arrested even with the addition of Ni. Surprisingly, the addition of silicon to form the alloy of this example (Mg-4% Cu-1% Si alloy with Na addition) reverses this trend to produce an alloy showing an EPH of 6.2 wt % $H_2$. This may be due to the embrittling effect of the silicon or its ability to disproportionately expand the volume of eutectic phase. This alloy has attractive performance at a favourable cost, making it commercially attractive.

TABLE 4

Composition and hydrogen performance data for various Cu—Si Compositions

| Cu—Si Related Compositions with no Na | | | | | Cu—Si Related Compositions with Na Added | | | | |
|---|---|---|---|---|---|---|---|---|---|
| Cu | Si | Ni | Act'vtion | EPH4 | Cu | Si | Ni | Act'vtion | EPH4 |
| 5.2 | 0 | | 7 | 4.3 | 5.2 | 0 | | 3 | 6.4 |
| 3.6 | 0.75 | | 11 | 2.6 | 3.6 | 0.7 | | 3 | 6.2 |
| 10 | 0 | | 5 | 3.4 | 14 | 0 | | 4 | 6.0 |
| | | | | | 4 | 3 | | 5 | 5.9 |
| 2.62 | 0.36 | 0.99 | 10 | 2.1 | 2.56 | 0.36 | 0.98 | 3 | 5.8 |
| | | | | | 2 | 0.2 | | 5 | 5.8 |
| | | | | | 0 | 4.5 | | 7 | 5.8 |
| 3.5 | 0 | | 12 | 2.7 | 3.5 | 0 | | 4 | 5.7 |
| | | | | | 2 | 2 | | 5 | 5.7 |
| 0 | 0.12 | | 3 | 4.0 | 0 | 0.28 | | 4.5 | 5.5 |

TABLE 4-continued

Composition and hydrogen performance data for various Cu—Si Compositions

| Cu—Si Related Compositions with no Na | | | | | Cu—Si Related Compositions with Na Added | | | | |
|---|---|---|---|---|---|---|---|---|---|
| Cu | Si | Ni | Act'vtion | EPH4 | Cu | Si | Ni | Act'vtion | EPH4 |
| 0 | 2.1 | | 6 | 2.6 | 0 | 2.06 | | 3 | 5.5 |
| 0 | 0.52 | | 5 | 4.0 | 0 | 0.52 | | 5 | 5.2 |
| | | | | | 1 | 1.2 | | 2 | 5.2 |
| 0 | 1.6 | | >20 | 0.0 | 0 | 1.6 | | 18 | 5.1 |
| 11 | 0 | | 2 | 5.3 | 24 | 0 | | 2 | 4.7 |

Ni and Si Added to Mg

Figure 6:
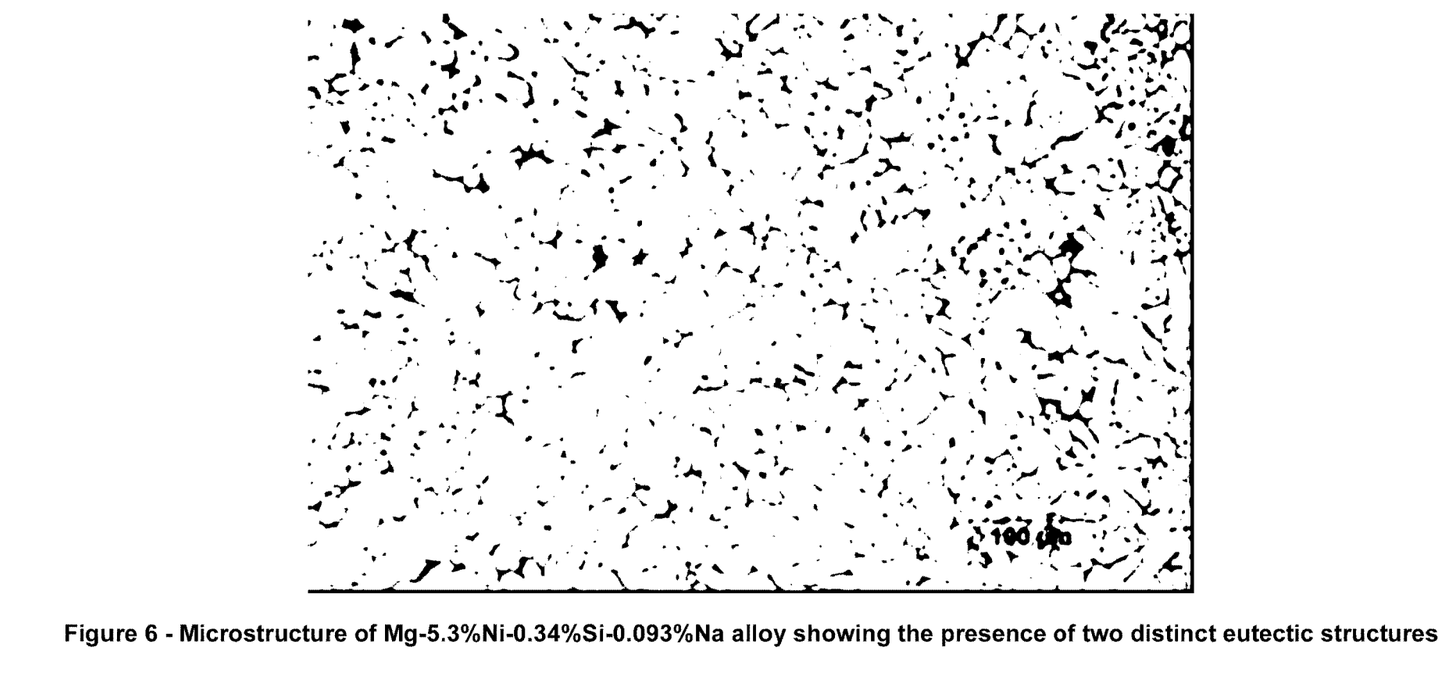

The addition of Ni and Si together to Mg differs from the combined effect of Cu and Si additions noted above. There appears to be little gain in adding Si at small amounts to alloys with Ni contents in the higher range, for example, about 5%; however, there are distinct gains when Si is added to alloys with lower Ni contents in the 1% range. We believe that this is due to fact that Mg—Ni eutectics, even in the absence of Na, are more potent than Mg—Cu eutectics in terms of their catalytic capability, therefore when the Ni content is high the addition of Si adds little to the alloy's hydrogen storage capacity. We further contend that when the amount of Mg—Ni eutectic is reduced as in a low Ni content alloy, a Si addition, even at low levels, is able to exert its very positive influence by forming large amounts of Mg—Si eutectic that open up pathways for hydrogen atom transport within the Mg grain structure (FIG. 6).

It appears that the direct substitution of Si for Ni will be possible in Mg—Ni alloys without substantial loss of hydrogen storage performance, and also that there may opportunities to reduce the total Ni plus Si alloy content as well, while maintaining adequate hydrogen storage characteristics for certain applications. As above, Si is much cheaper and lighter than Ni, and is also cheaper than Mg; therefore both of the above options will lead to a cheaper and lighter alloy that suits particular hydrogen storage or transportation applications that would otherwise be unavailable to higher Ni content alloys. This is true even for Si additions that are in the hypereutectic range, that is, greater than 1.3%.

As for the Mg—Cu—Si alloys described above, the addition of Na appears to exert greater beneficial effects in particular regions of the composition window for Mg—Ni—Si alloys. For example, the addition of Na appears to yield greater improvements to lower Ni content alloys than to higher Ni content alloys. This is believed to be because of the inherently greater catalytic effect of Ni than Si thus partially negating the benefit of Na addition.

Example 9

The addition of approximately 0.8% Si (a hypoeutectic amount) to a Mg-1.3% Ni alloy containing a further nominal addition of 2000 ppm Na increases the effective peak hydrogen storage level after cycling from 3.5 to 5.3%, a useful though modest level. This should be compared with a cyclic EPH value of 5.9% for a Na-containing Mg-5.3% Ni-0.4% Si alloy.

Example 10

We have found that a nominal Mg-1.6% Si-1% Ni alloy, that is containing a hypereutectic amount of Si, has an activation time of 6 hours and multiple cycle EPH4 value of only 1.6 wt %, a low level. However, the nominal addition of 2000 ppm Na to the alloy reduces activation time to 3 hours and raises the multiple cycle EPH value to 5.8 wt %, a commercially attractive level for certain applications. By comparison, a simple binary hypereutectic Mg-1.6% Si alloy displays an EPH of 0% before Na addition, and an EPH of 5.1% after Na addition, but with very long activation time of greater than 20 hours and 18 hours, respectively.

TABLE 5

Composition and hydrogen performance data for various Cu—Ni Compositions

| Ni—Si Related Compositions with no Na | | | | | Ni—Si Related Compositions with Na Added | | | | |
|---|---|---|---|---|---|---|---|---|---|
| Ni wt % | Si wt % | Cu wt % | Act'vtion | EPH4 | Ni wt % | Si wt % | Cu wt % | Act'vtion | EPH4 |
| 4.7 | 0 | | 6 | 5.1 | 4.7 | 0 | | 0 | 6.3 |
| 6.4 | 0.2 | | 5 | 5.2 | 5.3 | 0.34 | | 3 | 5.9 |
| 1 | 1.6 | | 6 | 1.6 | 1 | 1.5 | | 3 | 5.8 |
| 0.99 | 0.36 | 2.62 | 10 | 2.1 | 0.98 | 0.36 | 2.56 | 3 | 5.8 |
| | | | | | 0 | 4.5 | | 7 | 5.8 |
| | | | | | 5.2 | 0.15 | | 3 | 5.7 |
| 14 | 0 | | 6 | 5.1 | 14 | 0 | | 2 | 5.5 |
| 0 | 0.12 | | 3 | 4.0 | 0 | 0.28 | | 4.5 | 5.5 |
| 0 | 2.1 | | 6 | 2.6 | 0 | 2.06 | | 3 | 5.5 |
| | | | | | 1.1 | 0.84 | | 8 | 5.3 |
| 1 | 0.2 | | 12 | 2.6 | 1 | 0.2 | | 2 | 5.3 |
| 0 | 0.52 | | 5 | 4.0 | 0 | 0.52 | | 5 | 5.2 |
| 0 | 1.6 | | >20 | 0.0 | 0 | 1.6 | | 18 | 5.1 |
| | | | | | 4 | 3 | | 3 | 4.9 |
| | | | | | 2.58 | 0 | | 2 | 4.7 |
| | | | | | 4 | 1 | | 3 | 4.3 |
| | | | | | 1.3 | 0 | | 3.5 | 3.5 |

Cu, Ni and Si Added to Mg

The effects of a combined addition of Cu, Ni and Si into Mg (a quaternary alloy) are complex and result in interesting and useful changes to activation kinetics. In addition, there are clear benefits of adding Na to the quaternary alloys with strong improvements in both activation kinetics and overall storage performance observed.

Example 11

A nominal Mg-2.5% Cu-1% Ni-0.4% Si alloy without Na addition shows an activation time of 10 hours and a cyclic EPH value of 2.1% $H_2$. When a nominal addition of 2000 ppm Na is made, the alloy shows an improved activation time of 3 hours and an improved EPH of 5.8%.

If the same Na-containing quaternary alloy is compared with the Na-containing Mg-1.3% Ni-0.8% Si alloy from Example 9, it can be seen that there is an improvement in cyclic EPH value in the quaternary alloy compared to the ternary alloy, that is 5.8% compared to 5.3%.

If the same Na-containing quaternary alloy is compared with a Na-containing Mg-2.5% Cu-1% Ni ternary alloy, there are improved activation kinetics despite an increased activation period (3 hours activation, and saturation hydrogen value at 20 hour of 5.4%) compared to the Si-free ternary alloy (0 hours activation, saturation hydrogen value of 5.0%). Note: this data is not shown in Table 3. As such, the Mg-2.5% Cu-1% Ni alloy with Na is attractive for its favourable EPH performance, but the addition of the 0.4% Si can make the alloy cheaper and improve the activation performance.

As noted previously, Si is much cheaper and lighter than either Cu or Ni, and is also cheaper than Mg. Cu is also cheaper than Ni. Therefore any direct substitution of Si or Cu for Ni that is possible, or any reduction in total alloy content, will lead to a cheaper and lighter alloy.

TABLE 6

Composition and hydrogen performance data for various Cu—Ni—Si Compositions

| Cu—Ni—Si Related Compositions with no Na | | | | | Cu—Ni—Si Related Compositions with Na Added | | | | |
|---|---|---|---|---|---|---|---|---|---|
| Cu | Ni | Si | Act'vtion | EPH4 | Cu | Ni | Si | Act'vtion | EPH4 |
| 2.6 | 1 | 0.4 | 10 | 2.1 | 2.6 | 1 | 0.4 | 3 | 5.8 |
| 1 | 1 | 0.2 | 3 | 3.8 | 1 | 1 | 0.2 | 2 | 4.9 |
| 1 | 1 | 2 | Not measured | 3.4 | 1 | 1 | 2 | 2 | 5.0 |

Further Examples

Example 12

Review of the data for Mg—Ni—Si alloys (Na-added) shows that for alloys consisting of only Mg and Si with Na, the EPH values decrease with increasing Si. However, surprisingly, the increase is reversed at Mg-4.5% Si with Na addition; this alloy shows 5.8 wt % $H_2$. The light weight of the silicon combined with an extensive network of primary $Mg_2Si$ may be combining to create this effect. As noted, Si is cheaper than Mg, so the cost of the alloy is actually decreased at this relatively high addition, making it a commercially attractive.

SUMMARY

It will be understood that the invention disclosed and defined in this specification extends to all alternative combinations of two or more of the individual features mentioned or evident from the text or drawings. All of these different combinations constitute various alternative aspects of the invention.

TABLE 3

Composition and hydrogen performance data for examples 1-11 above

| Example No. | Nominal alloy composition (mass % of elements; balance Mg) | Nominal Na (ppm) | Activation time (hr) | Cyclic EPH (mass %) |
|---|---|---|---|---|
| 1 | 5 Al, 3 Ca | 0 | 15 | 1.1 |
| | | 2000 | 8 | 3.7 |
| 2 | 5.2 Cu | 0 | 7 | 4.3 |
| | | 2000 | 3 | 6.4 |
| 3 | 0.5 Si | 0 | 5 | 4.0 |
| | | 2000 | 5 | 5.2 |
| 4 | 1.6 Si | 0 | >20 | 0 |
| | | 2000 | 18 | 5.1 |
| 5 | 2.1 Si | 0 | 6 | 2.6 |
| | | 2000 | 3 | 5.5 |
| 6 | 4 Cu, 1 Ni | 0 | 4 | 5.1 |
| | | 2000 | 0 | 6.5 |
| 7 | 3.5 Cu, 3.5 Ni | 0 | 5 | 5.1 |
| | | 2000 | 2 | 6.0 |
| 8 | 4 Cu, 1 Si | 0 | 11 | 2.6 |
| | | 2000 | 3 | 6.2 |
| 9 | 1.3 Ni, 0.8 Si | 0 | >20 | 3.5 |
| | | 2000 | 8 | 5.3 |
| | 5.3 Ni, 0.4 Si | 2000 | 3 | 5.9 |
| 10 | 1 Ni, 1.6 Si | 0 | 6 | 1.6 |
| | | 2000 | 3 | 5.8 |

TABLE 3-continued

Composition and hydrogen performance data for examples 1-11 above

| Example No. | Nominal alloy composition (mass % of elements; balance Mg) | Nominal Na (ppm) | Activation time (hr) | Cyclic EPH (mass %) |
|---|---|---|---|---|
| 11 | 2.5 Cu, 1 Ni, 0.4 Si | 0 | 10 | 2.1 |
| | | 2000 | 3 | 5.8 |
| 12 | 4.5 Si | 0 | Not Tested | Not Tested |
| | | 2000 | 7 | 5.8 |

The invention claimed is:

1. A Mg—Cu alloy that is able to be formed by casting methods and which is suitable for hydrogen storage applications and which consists of:
   i. an amount of Cu such that the Mg—Cu alloy is hypoeutectic with respect to Cu content, that is greater than zero and less than 32 mass % Cu; and an amount of Ni such that the Mg—Cu alloy is hypoeutectic with respect to Ni content, that is between 0.1 mass % and 9 mass % Ni;
   ii. an amount of Na that is greater than zero and up to 20,000 ppm by mass;
   iii. incidental impurities totaling less than 0.5 mass %; and
   iv. a balance of the Mg—Cu alloy mass being Mg,
   wherein the Mg—Cu alloy has a primary crystallized Mg phase and a subsequently crystallized mixture of Mg—Cu based eutectic and Mg—Ni based eutectic and/or Mg—Cu—Ni based eutectic.

2. The Mg—Cu alloy of claim 1, wherein the amount of Na is between 200 and 4000 ppm by mass.

3. The Mg—Cu alloy of claim 1, wherein the amount of Na is between 800 and 2000 ppm by mass.

4. The Mg—Cu alloy of claim 1, wherein the amount of Ni is between 0.1 mass % and 5.5 mass %.

* * * * *